Figure 1:
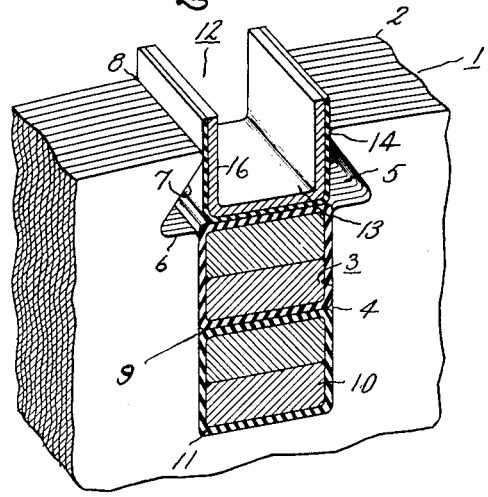

May 8, 1956 M. J. BALDWIN 2,745,030
DYNAMOELECTRIC MACHINE CORE MEMBER AND METHOD OF MAKING SAME
Filed Sept. 3, 1952

Inventor:
Morris J. Baldwin,
by Prowell F. Mack
His Attorney.

United States Patent Office 2,745,030
Patented May 8, 1956

2,745,030

DYNAMOELECTRIC MACHINE CORE MEMBER AND METHOD OF MAKING SAME

Morris J. Baldwin, Erie, Pa., assignor to General Electric Company, a corporation of New York Application September 3, 1952, Serial No. 307,688

6 Claims. (Cl. 310—214)

This invention relates to core members for dynamoelectric machines, particularly the armatures of commutator-type machines, and is particularly concerned with wedges used to retain conductors in the winding slots of such core members and the method of installing such wedges.

In the conventional armature construction for commutator-type dynamoelectric machines, a core is provided formed of a plurality of relatively thin laminations of magnetic material and having a plurality of axially extending winding slots formed in its outer periphery in which the conductors making up the armature winding are positioned. These winding slots are usually formed with a lower portion in which the conductors are arranged and an upper portion which is wider at its base than the lower portion and which has walls inclined toward each other defining a slot opening narrower than its base. In order to retain the conductors in the slots, slot wedges are ordinarily driven into the upper slot portions over the conductors. These wedges are preferably formed of non-magnetic material and in the past have frequently been formed of wood or other materials, for example, plastics. Difficulties have been experienced with such constructions since the slot wedges may shrink when the machine is in use, thus allowing the conductors to become loose in the slots. Furthermore, the insulation surrounding the conductors may also shrink, also contributing to loose windings. Metal slot wedges have been utilized in the past, such wedges being ordinarily formed of laminations secured together by some bonding material. While these wedges do not shrink, they do not compensate for shrinkage of the insulation surrounding the conductors and, furthermore, both the metal wedges and the wooden wedges completely fill the upper portion of the slots thus reducing the heat radiating area of the core.

It is therefore desirable to provide a slot wedge for an armature which will not shrink and, further which will continuously apply pressure on the conductors to compensate for shrinkage of the conductor insulation. It is further desirable that such wedges not occupy the entire area of the upper slot portion so that an increase in radiating area may be effected. It is also desirable that these wedges be quickly and easily installed.

An object of this invention, therefore, is to provide an improved dynamoelectric machine core construction utilizing slot wedges incorporating the desirable features set forth above.

Another object of this invention is to provide an improved method of wedging dynamoelectric machine core member conductors.

Further objects and advantages of this invention will become apparent and the invention will be better understood by reference to the following description and the accompanying drawing, and the features of novelty which characterize this invention will be pointed out with particularity in the claims annexed to and forming a part of the specification.

In accordance with this invention, a dynamoelectric machine core member is provided having winding slots formed therein with conductors arranged in the slots. Substantially U-shaped wedge members are arranged in the slots over the conductors with their base portions bearing on the conductors and with their legs tightly engaging the walls of the slot thereby wedging the conductors in place. The outer surfaces of these wedges may be coated with insulating material in order to prevent shorting of the core laminations. As a further feature, the outer portions of the base of each wedge are inclined upwardly from the center portion of the base toward the walls of the upper slot portion, thereby providing sufficient resiliency to continuously apply pressure on the conductor. In order to install these wedges, a U-shaped wedge member is initially arranged in the slot with its base resting on the conductor and it is then swedged into the slot so that its legs tightly engage the walls thereof.

Figure 2:
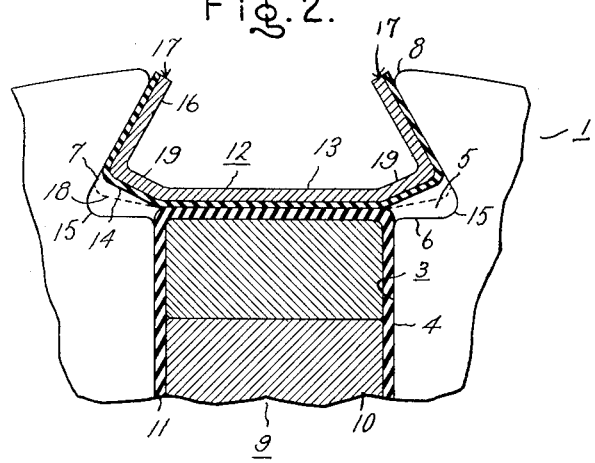

In the drawing,

Fig. 1 is a fragmentary view in perspective illustrating a portion of an armature member with the U-shaped wedge member in position in the slot prior to swedging; and Fig. 2 is a fragmentary cross-sectional view illustrating the improved wedge member of this invention after it has been swedged into position.

Referring now to Fig. 1, there is shown a portion of an armature core 1 formed of a plurality of relatively thin laminations 2 of magnetic material. A winding slot 3 is formed in the outer periphery of the core 1 and has a lower rectangular portion 4 and an upper portion 5. The base 6 of the upper portion 5 is wider than the lower portion 4 and its walls 7 are inclined toward each other so that the slot opening 8 is narrower than the base 6. A winding 9 is positioned in the lower slot portion 4 and is made up of individual conductors 10 surrounded by suitable insulation 11. As will be seen in the drawing, the winding 9 extends slightly into the upper slot portion 4.

In order to wedge the winding 9 in the lower slot portion 4, a U-shaped wedge member 12 is laid in the top portion 5 of the slot with its base 13 resting on the upper surface of the winding 9. This wedge is preferably formed of non-magnetic resilient metal, such as steel, and preferably has an exterior surface coated with insulating material 14. Referring now to Fig. 2, in order to secure the wedge member 12 in the upper slot portion 5, the wedge is swedged down into the corners 15 of the upper slot portion 5, for example, by applying pressure on the legs 16, as shown by the arrows 17. It will be seen in Fig. 1 that the legs 16 of the wedge 12 initially project above the outer periphery of the core 1 and that after the swedging operation they are within the upper slot portion 5. During the swedging operation, the legs 16 are forced downwardly so that the wedge assumes a position indicated by the dotted lines 18 in Fig. 2. When pressure is released, the resiliency of the material returns it to the position shown in solid lines in Fig. 2. After the swedging operation, therefore, the center portion of the base 13 bears on the upper surface of the winding 9 while the outer side portions 19 of the base are inclined upwardly toward the walls 7 of the upper slot portion 5 in spaced relation with the base 6 and the legs 16 tightly engage the walls 7.

It is now seen that this improved wedge construction will resiliently retain the winding 9 in the lower slot portion 4 with the spring action due to its configuration keeping the coil tight in the slot to compensate for shrinkage of the insulation. It will also be seen that variations in the height of the individual windings 9 will not be a factor in keeping the windings tight in the slots and that a reasonably low unit pressure on the insulation between the wedge 12 and the core teeth is possible. The provision of the insulation 14 on the external surfaces of the wedges keeps the losses reasonably low, and it will be readily apparent that the application of the wedge is simple, thus producing a low unit cost. An additional feature of this construction is the fact that the radiating area of the core is effectively increased. These wedges may be applied in full slot lengths or in the alternative, a number of shorter wedges may be used in each slot. In addition to applying the insulating material, such as resin, directly to the exterior surface of the wedges, the insulation may take the form of paper strips either laid in the slots or attached directly to the wedge. While this improved slot wedge construction has been described in connection with armatures, it will be readily apparent that it is equally applicable to stator cores as well.

While I have shown and described a specific embodiment of this invention, further modifications and improvements will occur to those skilled in the art. I desire it to be understood, therefore, that this invention is not limited to the forms shown and I intend in the appended claims to cover all modifications which do not depart from the spirit and scope of this invention.

What I claim as new and desire to secure by Letters Patent of the United States is:

1. The method of wedging a conductor in a slot of a dynamoelectric machine core member, which method comprises placing a U-shaped wedge member in said slot with its base resting on said conductor and its legs projecting from said slot, and swedging said legs of said wedge member so that said legs are within said slot and tightly engaging the walls thereof thereby wedging said conductor therein.

2. The method of wedging a conductor in a dynamoelectric machine core member slot having a lower portion in which said conductor is arranged and an enlarged upper portion having a slot opening narrower than its base, which method comprises placing a U-shaped wedge member in said upper slot portion with its base resting on the upper surface of said conductor, and swedging the legs of said wedge member so that said legs tightly engage the walls of said upper slot portion thereby wedging said conductor in said lower slot portion.

3. In a dynamoelectric machine, a core member having a winding slot formed therein, said slot having a lower portion and an upper portion, said upper slot portion being wider at its base than said lower portion and having its walls inclined toward each other defining a slot opening narrower than its base, a conductor arranged in said lower slot portion projecting into said upper slot portion, and a substantially U-shaped wedge member formed of resilient metal arranged in said upper slot portion with the center portion of its base substantially covering and bearing on said conductor, said wedge member having the side portions of its base inclined upwardly from said center portion towards said upper slot portion walls and its legs tightly engaging said walls thereby resiliently wedging said conductor in said lower slot portion.

4. In a dynamoelectric machine, a core member formed of a plurality of relatively thin laminations of magnetic material and having a winding slot formed therein, said slot having a lower portion and an upper portion, said upper slot portion being wider at its base than said lower portion and having its walls inclined toward each other defining a slot opening narrower than its base, a conductor arranged in said lower slot portion projecting into said upper slot portion, and a substantially U-shaped wedge member formed of non-magnetic resilient metal arranged in said upper slot portion with the center portion of its base substantially covering and bearing on the upper surface of said conductor, said wedge member having the side portions of its base inclined upwardly from said center portion towards said outer slot portion walls and its legs tightly engaging said walls thereby resiliently wedging said conductor in said lower slot portion, said wedge member being coated with insulating material.

5. A method of wedging a conductor in a slot of a dynamoelectric machine core member having a slot with a lower portion for receiving a conductor and an upper portion for receiving a wedge, which method comprises placing a conductor in said lower portion of said slot so that it projects into said upper portion of said slot, placing a U-shaped wedge member in said slot with its base resting on the upper surface of said conductor and swedging the legs of said member into tight engagement with the walls of said upper slot portion thereby wedging said conductor in said slot.

6. A method of wedging a conductor in a slot of a dynamoelectric core member having a slot with a lower portion for receiving a conductor and an upper portion for receiving a wedge, having its walls inclined toward each other so that the opening of said upper portion is narrower than the base of said upper portion, which method comprises placing a resilient U-shaped wedge member in said upper portion of said slot with its base resting on the upper surface of said conductor and swedging the legs of said member into tight engagement with the inclined walls of said slot with said legs inclined toward each other thereby resiliently wedging said conductor in said slot.

References Cited in the file of this patent

FOREIGN PATENTS 15,148    Great Britain _____ of 1913